(12) United States Patent
Chereshnev et al.

(10) Patent No.: US 10,223,522 B2
(45) Date of Patent: Mar. 5, 2019

(54) SYSTEM AND METHOD FOR PROTECTING MOBILE DEVICE WHEN INTERACTING WITH A COMPUTER

(71) Applicant: AO Kaspersky Lab, Moscow (RU)

(72) Inventors: Evgeny M. Chereshnev, Moscow (RU); Alexey S. Komarov, Moscow (RU); Sergey L. Lurye, Moscow (RU)

(73) Assignee: AO Kaspersky Lab, Moscow (RU)

( * ) Notice: Subject to any disclaimer, the term of this patent is extended or adjusted under 35 U.S.C. 154(b) by 294 days.

(21) Appl. No.: 15/260,458

(22) Filed: Sep. 9, 2016

(65) Prior Publication Data

US 2017/0337370 A1   Nov. 23, 2017

(30) Foreign Application Priority Data

May 20, 2016   (RU) ................ 2016119513

(51) Int. Cl.
*G06F 21/00*    (2013.01)
*G06F 21/44*    (2013.01)
*G06F 21/62*    (2013.01)
*G06K 9/62*     (2006.01)
*H02J 7/00*     (2006.01)
(Continued)

(52) U.S. Cl.
CPC .......... *G06F 21/44* (2013.01); *G06F 21/6218* (2013.01); *G06F 21/82* (2013.01); *G06K 9/6215* (2013.01); *H02J 7/0052* (2013.01); *H04B 1/3833* (2013.01); *H04L 63/105* (2013.01); *H04L 63/107* (2013.01); *H04L 67/141* (2013.01); *H04W 12/06* (2013.01); *G06F 1/266* (2013.01); *H02J 2007/006* (2013.01); *H02J 2007/0062* (2013.01); *H02J 2007/0096* (2013.01)

(58) Field of Classification Search
CPC ... G06F 21/44; G06F 21/6218; H04L 63/105; H04L 63/107; H04L 67/141
See application file for complete search history.

(56) References Cited

U.S. PATENT DOCUMENTS 8,209,739 B2    6/2012  Terpening et al.
2010/0048167 A1* 2/2010  Chow ............... H04L 29/12594
                                                    455/410
(Continued)

*Primary Examiner* — Jeffrey C Pwu
*Assistant Examiner* — Thong P Truong
(74) *Attorney, Agent, or Firm* — Arent Fox LLP; Michael Fainberg

(57) ABSTRACT

Disclosed are systems and methods for protecting data of a mobile device when interacting with a computer. An exemplary system comprises: a mobile device connected with a computer via a security adapter for charging purposes. The mobile device is configured to: determine and collect a plurality of parameters for determining a security level of a data transmission mode between the computer and the mobile device, and transmit the security level to the security adapter. The security adapter is configured to: determine a number of additional requests from the computer for establishing the data transmission mode with the mobile device; determine rules for establishing the data transmission mode between the computer and the mobile device based at least on the security level and the number of additional requests from the computer; and establish the data transmission mode between the computer and the mobile device in connection with the rules.

20 Claims, 5 Drawing Sheets

(51) Int. Cl.
*H04B 1/3827* (2015.01)
*H04L 29/06* (2006.01)
*H04L 29/08* (2006.01)
*H04W 12/06* (2009.01)
*G06F 21/82* (2013.01)
*G06F 1/26* (2006.01)

(56) References Cited

U.S. PATENT DOCUMENTS

2014/0282860 A1* 9/2014 Efrati .................... H04W 12/08
726/1
2014/0337558 A1* 11/2014 Powers ............... G06F 13/4072
710/313

* cited by examiner

Fig. 2

| |
|---|
| Accelerometer 222 |
| Gyroscope 223 |
| Hall sensor 224 |
| Dosimeter 225 |
| NFC module 226 |
| LTE module 227 |

| |
|---|
| Ultraviolet light sensor 209 |
| Geolocation receiver 210 |
| GSM module 211 |
| Bluetooth 212 |
| Wi-Fi 213 |
| Camera 214 |
| Ambient temperature sensor 215 |
| Barometer 216 |
| Electronic compass 217 |
| Humidity sensor 218 |
| Illumination sensor 219 |
| Proximity sensor 220 |
| Image depth sensor 221 |

| |
|---|
| Heart rate monitor 201 |
| Blood oxygen saturation sensor 202 |
| Step counter 203 |
| Fingerprint sensor 204 |
| Gesture sensor 205 |
| Camera directed at the eyes 206 |
| User body temperature sensor 207 |
| Microphone 208 |

SYSTEM AND METHOD FOR PROTECTING MOBILE DEVICE WHEN INTERACTING WITH A COMPUTER

CROSS-REFERENCE TO RELATED APPLICATIONS

The present disclosure claims benefit of priority under 35 U.S.C. 119(a)-(d) to a Russian Application No. 2016119513 filed on May 20, 2016, which is incorporated by reference herein.

FIELD OF TECHNOLOGY

The present dislcosure relates to the field of computer security and, specifically to systems and methods of protecting a mobile device when interacting with a computer.

BACKGROUND

Each year the number of mobile devices increases, and their performance is also increasing. The pace of development of battery production technologies is not keeping up with the rate of growth of the power consumption of mobile devices, so that modern smartphones and tablets usually need to be charged every day, or sometimes several times a day. As a result, charging stations or kiosks for powering the batteries of mobile devices are becoming increasingly more common—they are situated in convenient public places and are free of charge. One of the most popular data and power transmission interfaces may include USB. However, in certain cases the USB port at charging stations may not be connected to a power adapter, but to a computer system, usually a computer. The danger in this case is the possible transmission of confidential data from the mobile device, as well as the possibility of infecting the mobile device with malicious software from the computer connected to such a USB port.

There are certain adapters and cables only supplying power to mobile devices and blocking data transmission. Some adapters may have a built-in microcontroller for additional analysis and filtering of data being transmitted. However, if a user needs to connect a mobile device to an unknown computer in order to transmit data (such as upload photographs onto a computer for the printing of photographs), he may need to disconnect the adapter which is blocking the data transmission or disconnect the filtering of the data being transmitted in the adapter with a built-in microcontroller. At the same time, some such computers may present a danger of which the user is unaware.

Accordingly, there is a need to protect data on a mobile device when interacting with a computer.

SUMMARY

Disclose are systems, methods and compute program products for protecting mobile device during an interaction with a computer. The technical result includes protecting the user's data when connecting a mobile device to a computer by checking the computer for a safe connection of the mobile device, followed by formation of a data transmission mode.

One exemplary computer-implemented method for protecting a mobile device comprises: connecting the mobile device with a computer via a security adapter for charging the mobile device; in response to receiving a request from the computer for exchanging data with the mobile device, determining and collecting, by a processor of the mobile device, a plurality of parameters relating to an establishment of a data transmission mode between the computer and the mobile device; determining a security level of the establishment of the data transmission mode based at least on the plurality of parameters; and transmitting the security level information to the security adapter for determining rules for establishing the data transmission mode between the computer and the mobile device.

In one exemplary aspect, the computer is a power supply source for both the security adapter and the mobile device via the security adapter, and determining the security level of the establishment of the data transmission mode based at least on the plurality of parameters comprises transmitting by the mobile device the plurality of parameters to a remote server for determining the security level.

In another exemplary aspect, determining the security level of the establishment of the data transmission mode based at least on the plurality of parameters comprises: obtaining various parameters and security levels from the remote server; storing the various parameters and security levels on a local database of the mobile device; and determining the security level of the establishment of the data transmission mode at least in connection with saved parameters and security levels on the local database of the mobile device.

In yet another exemplary aspect, the plurality of parameters comprise coordinates of the mobile device determined via at least one of: a receiver of a geolocation system; a cellular communication module determining a location of the mobile device based on signals from base stations; and data obtained from other communication devices.

In another exemplary aspect, the plurality of parameters comprise information relating to a location of the mobile device inside or outside a room, and the information relating to the location of the mobile device inside the room is determined by at least one of: a comparison of geolocation data with a map of locality; an analysis of an audio signal via a microphone; a comparison of a degree of similarity of images obtained from a camera to a previously determined set of images; and an analysis of at least one of: temperature readings; humidity readings; barometer readings; light sensor readings; proximity sensor readings; magnetic field sensor readings.

Another exemplary computer-implemented method for protecting a mobile device comprises: connecting the mobile device with a computer via a security adapter for charging the mobile device; receiving by the security adapter a request from the computer for exchanging data with the mobile device; transmitting the request to the mobile device for determining a security level of an establishment of a data transmission mode between the mobile device and the computer; in response to receiving the security level from the mobile device, determining a number of additional requests from the computer for establishing the data transmission mode with the mobile device while the mobile device determining the security level in response to the request; determining one or more rules for establishing the data transmission mode between the computer and the mobile device based at least on the security level and the number of additional requests from the computer; and establishing the data transmission mode between the computer and the mobile device in connection with the one or more rules.

In one exemplary aspect, the method further comprises blocking a data transmission between the mobile device and the computer until the time of formation of the data transmission mode.

In another exemplary aspect, the one or more rules comprise at least one of: continue blocking the data transmission if the security level is high, but during the obtaining of the security level the computer sent to the security adapter new requests to make a connection with the mobile device in a number greater than a specified value in the memory module; continue blocking the data transmission if the security level is low; unblock the data transmission in all other instances; and unblock the data transmission if a command to unblock the data transmission received from a user of the mobile device.

A security adapter for protection for data of a mobile device when connecting the mobile device to a computer, the security adapter comprising: a plug for connecting to a port of the computer by a wired data transmission interface; a port for connecting to a plug of the mobile device by the wired data transmission interface; a transceiver for interacting with a decision-making module and configured to: send a request to the mobile device for determining a security level of a data transmission between the mobile device and the computer, and receive from the mobile device the security level. The decision-making module is configured to: determine a presence or absence of a request from the computer for establishing the data transmission with the mobile device during a specified time, transmit the determined information to the transceiver, block data transmissions between the mobile device and the computer until a data transmission mode therebetween, receive from the transceiver the security level, count a number of additional requests from the computer for establishing the data transmission mode with the mobile device while the mobile device determining the security level in response to the request, select at least one rule for establishing the data transmission mode between the mobile device and the computer from the memory module based on the security level and the number of additional requests, and establish the data transmission mode between the mobile device and the computer in accordance with the at least one rule. The memory module is configured to obtain and store rules for establishing the data transmission mode between the mobile device and the computer.

A device for determining a security level of an establishment of a data transmission mode, the device comprising a processor configured to: connect a mobile device with a computer via a security adapter for charging the mobile device; in response to receiving a request from the computer for exchanging data with the mobile device, determine and collect a plurality of parameters relating to an establishment of a data transmission mode between the computer and the mobile device; determine a security level of the establishment of the data transmission mode based at least on the plurality of parameters; and transmit the security level to the security adapter for determining rules for establishing the data transmission mode between the computer and the mobile device.

A non-transitory computer readable medium storing computer executable instruction for protecting a mobile device, including instructions for: connecting the mobile device with a computer via a security adapter for charging the mobile device; in response to receiving a request from the computer for exchanging data with the mobile device, determining and collecting, by a processor of the mobile device, a plurality of parameters relating to an establishment of a data transmission mode between the computer and the mobile device; determining, by the processor, a security level of the establishment of the data transmission mode based at least on the plurality of parameters; and transmitting the security level to the security adapter for determining rules for establishing the data transmission mode between the computer and the mobile device.

A non-transitory computer readable medium storing computer executable instruction for protecting a mobile device, including instructions for: connecting the mobile device with a computer via a security adapter for charging the mobile device; receiving by the security adapter a request from the computer for exchanging data with the mobile device; transmitting the request to the mobile device for determining a security level of an establishment of a data transmission mode between the mobile device and the computer; in response to receiving the security level from the mobile device, determining a number of additional requests from the computer for establishing the data transmission mode with the mobile device while the mobile device determining the security level in response to the request; determining one or more rules for establishing the data transmission mode between the computer and the mobile device based at least one the security level and the number of additional requests from the computer; and establishing the data transmission mode between the computer and the mobile device in connection with the one or more rules.

A system for ensuring data security in establishing a data transmission mode between devices, the system comprising: a mobile device connected with a computer via a security adapter for charging purposes; and the security adapter, wherein the mobile device is configured to: determine and collect a plurality of parameters relating to an establishment of the data transmission mode between the computer and the mobile device in response to a request from the computer, determine a security level of the establishment of the data transmission mode based at least on the plurality of parameters, and transmit the security level to the security adapter; wherein the security adapter is configured to: in response to receiving the security level from the mobile device, determine a number of additional requests from the computer for establishing the data transmission mode with the mobile device while the mobile device determining the security level; determine one or more rules for establishing the data transmission mode between the computer and the mobile device based at least on the security level and the number of additional requests from the computer; and establish the data transmission mode between the computer and the mobile device in connection with the one or more rules.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 illustrates a list of sensors of a mobile device according to aspects of the invention.

DETAILED DESCRIPTION

Example aspects are described herein in the context of a system, method and computer program product for protecting a mobile device when interacting with a computer. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
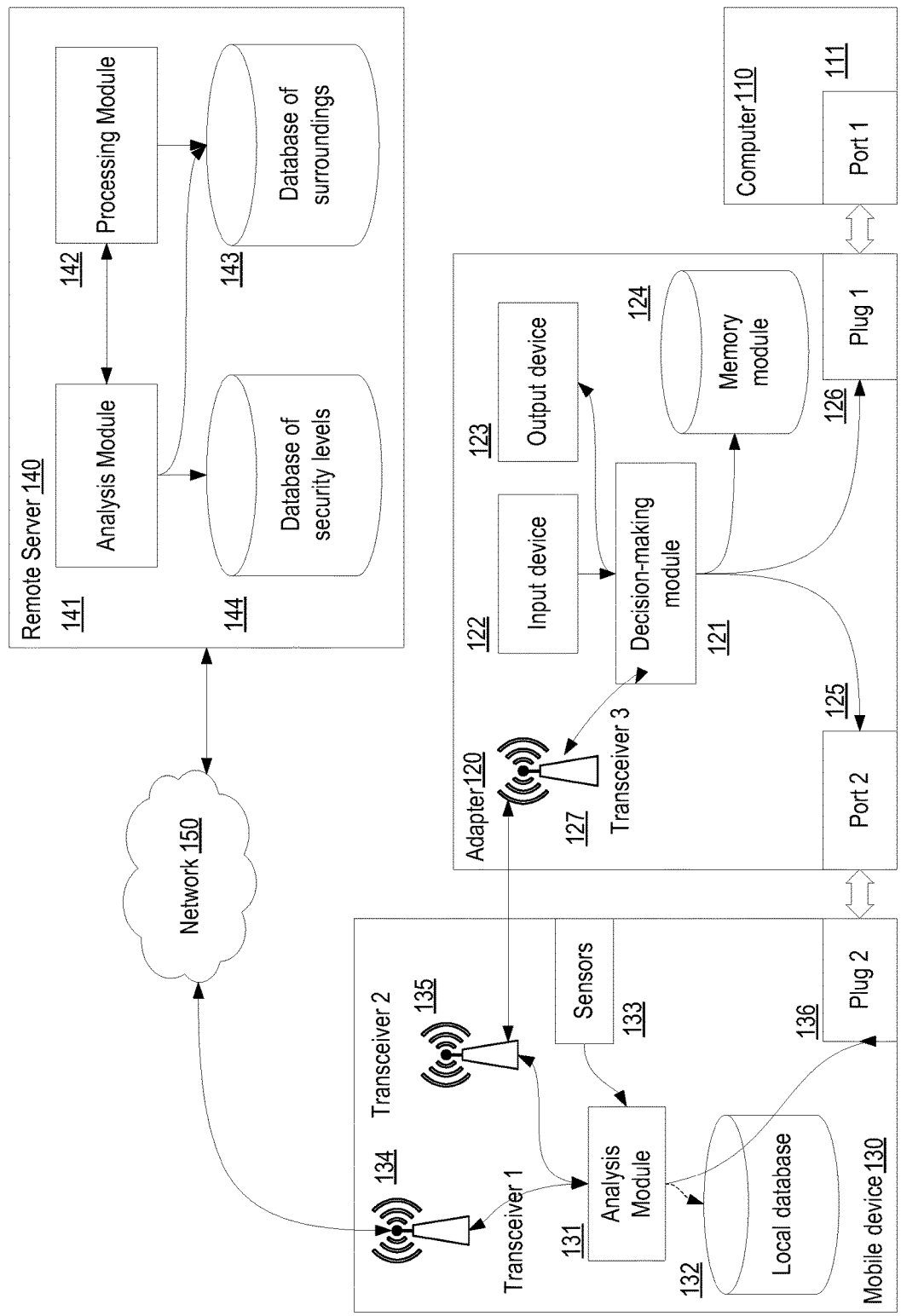
FIG. 1 illustrates a diagram of a system for protecting data during an interaction of a mobile device with a computer according to aspects of the invention.

FIG. 1 shows a diagram of a system for protecting data during an interaction of a mobile device with a computer according to aspects of the invention. The system may include a mobile device 130 (such as a smartphone, a tablet, a video camera, a fitness bracelet, and so forth), having a plug 2 (136) of a wired data transmission interface (such as USB, Thunderbolt, FireWire). A security adapter 120 (hereinafter, the adapter) may be a separate computer device and may be configured to provide protection for the data of the mobile device 130 when the mobile device 130 is connected to a computer 110 via, e.g., a wired data transmission interface. The adapter 120 may contain a port 2 (125), to which is connected the plug 2 (136) of the mobile device 130 by the wired data transmission interface, and also a plug 1 (126), connected to the port 1 (111) of the computer 110 by the wired data transmission interface. Thus, the adapter 120 may be configured to connect the mobile device 130 to the computer 110 via the adapter 120 by a wired data transmission interface, wherein the adapter 120 may block the transmittal of data between the mobile device 130 and the computer 110 until a data transmission mode may be established. In one exemplary aspect, there may be two data transmission modes—data transmission carried out or data transmission blocked. In both modes, there may be a transmission of electric power to the mobile device 130. The blocking of the data transmission may be carried out by breaking the connection of the data transmission lines (for example, in USB 2.0, the contacts D+ and D−). The breaking of the data transmission lines may be done either mechanically by the use of a switch or by the use of a relay.

The computer 110 may include a port 1 (111) of the data transmission interface. The computer 110 may be the power supply source for the adapter 120 and the mobile device 130 through the adapter 120. Thus, in the context of the present invention, the collective term "computer" may be applicable to both electronic calculating devices and to charging devices for the charging of the battery of the mobile device 130 from an alternating current network or from their own battery.

The mobile device 130 may contain a transceiver 1 (134) for exchanging data with a remote server 140 via, e.g., a computer network 150, and also a transceiver 2 (135) for exchanging data with a transceiver 3 (127) associated with the adapter 120. The mobile device 130 may also contain an analysis module 131, connected to the transceivers 1-2 (134-135), to an array of sensors 133 and to the plug 2 (136).

Among the sensors 133 there may include, for example, the following sensors and devices depicted in FIG. 2:
- a heart rate monitor (heartbeat sensor) 201 for determining the pulse frequency of the user;
- a sensor for the oxygen saturation of the blood 202;
- a step counter 203;
- a fingerprint sensor 204;
- a gesture sensor 205, used to identify gestures of the user;
- a camera directed at the user's eye 206, used to determine eye motions of the user, as well as to authenticate the identity of the user by means of the iris membrane or retina of the eye;
- a body temperature sensor 207 (for example, having direct contact with the user's body, or noncontact type);
- a microphone 208;
- an ultraviolet light sensor 209;
- a receiver of a geolocation system 210, such as a GPS or GLONASS receiver;
- a GSM module 211;
- a Bluetooth module 212;
- a Wi-Fi module 213;
- a camera 214 aimed at the surroundings of the user's device;
- a sensor of the ambient temperature 215;
- a barometer 216, necessary to measuring the atmospheric pressure and determining the altitude above sea level in accordance with the atmospheric pressure;
- a geomagnetic sensor 217 (electronic compass), needed to determine the directions and azimuth;
- a sensor for determining the air humidity 218;
- a sensor of the level of lighting 219, needed to determine the color temperature and illuminance;
- a proximity sensor 220, used to determine the distance of various objects located in the vicinity;
- an image depth sensor 221, used to obtain a three-dimensional image of space;
- an accelerometer 222, used to measure the acceleration in space;
- a gyroscope 223, needed to determine a position in space;
- a Hall sensor 224 (of magnetic field), for determining the magnetic field intensity;
- a dosimeter/radiometer 225, for determining the level of radiation;
- a NFC module 226;
- a LTE module 227.

Referring back to FIG. 1, sensors 133 may be disposed either on the mobile device 130 itself or on individual portable devices connected to the mobile device 130.

The transceivers 1, 2, 3 (134, 135, 127) may include a GSM, Wi-Fi, LTE, NFC module or any other module with support for wireless communication interfaces.

In one exemplary aspect, the mobile device 130 may contain a local database 132 in which the analysis module 131 may store data received from the remote server 140.

The adapter 120 may include a decision-making module 121 and, connected to it, an input device 122 and an output device 123. In an exemplary aspect, the input device 122 and the output device 123 may be combined into a single device, such as a sensory display. In yet another aspect, the adapter 120 may also contain a memory module 124, connected to the decision-making module 121. The decision-making module 121 may also be connected to the port 2 (125) and the plug 1 (126).

The adapter 120 may receive power supply from the computer 110. Alternatively, the adapter 120 may contain a battery.

The remote server 140 may contain an analysis module 141 and, connected to it, a processing module 142 and a database of surroundings 143, as well as a database of security levels 144. In one aspect, the databases 143 and 144 may be combined into a single database.

As mentioned above, the security adapter 120 may contain the transceiver 3 (127), which may interact with the decision-making module 121 and may be configured to:

- send a request to the mobile device 130 via the transceiver 2 (135) for a determination of the security level, wherein the request may contain information on the presence or absence, during a time specified by the decision-making module 121, of a request from the computer 110 to make a connection with the mobile device 130 for data exchange;
- receive from the mobile device 130 via the transceiver 2 (135) the security level, where the security level may be defined as a parameter taking on a low or a high value and determining the probability of the connection to the computer 110 being secure;

As shown below in FIG. 4, a method of formation of the security level and the probability of the connection being secure will be explained in further detail.

The decision-making module 121 may be configured to:

- determine the presence or absence during a specified time of a request from the computer 110 to make a connection with the mobile device 130 for the exchange of data;
- transmit the determined information (the presence or absence of the request from the computer 110 to make a connection) to the transceiver 3 (127);
- block the transmission of data between the mobile device 130 and the computer 110 until the time of formation of the data transmission mode;
- receive from the transceiver 3 (127) the security level (i.e., from the mobile device 130 via the transceiver 3 (127));
- count the number of new requests to make a connection with the mobile device 130 during the time of waiting for the security level from the mobile device 130;
- select a rule for the formation of the data transmission mode (examples of rules will be discussed below) between the mobile device 130 and the computer 110 from the memory module 124 based on the obtained security level and the counted number of new requests to make a connection;
- form the data transmission mode in accordance with the selected rule from the memory module.

The memory module 124 may include any given memory module (such as flash memory, SSD, HDD, SRAM and so on) and it may contain the rules of formation of the data transmission mode between the mobile device 130 and the computer 110, the rules being as follows:

- continue blocking the data transmission if the security level is high, but during the obtaining of the security level the computer 110 sent to the security adapter 120 new requests to make a connection with the mobile device in a number greater than a specified value;
- continue blocking the data transmission if the security level is low;
- unblock the data transmission in all other instances (for example, if a command to unblock the data transmission has arrived at the input device 122 from the user).

Additional examples of the interaction of the mobile device 130 with the computer 110 via the security adapter 120 will be presented below, in the description of FIGS. 3-4.

Moreover, aspects with respect to the use of a remote server 140 will also be presented below in the description of FIGS. 3-4.

Figure 3:
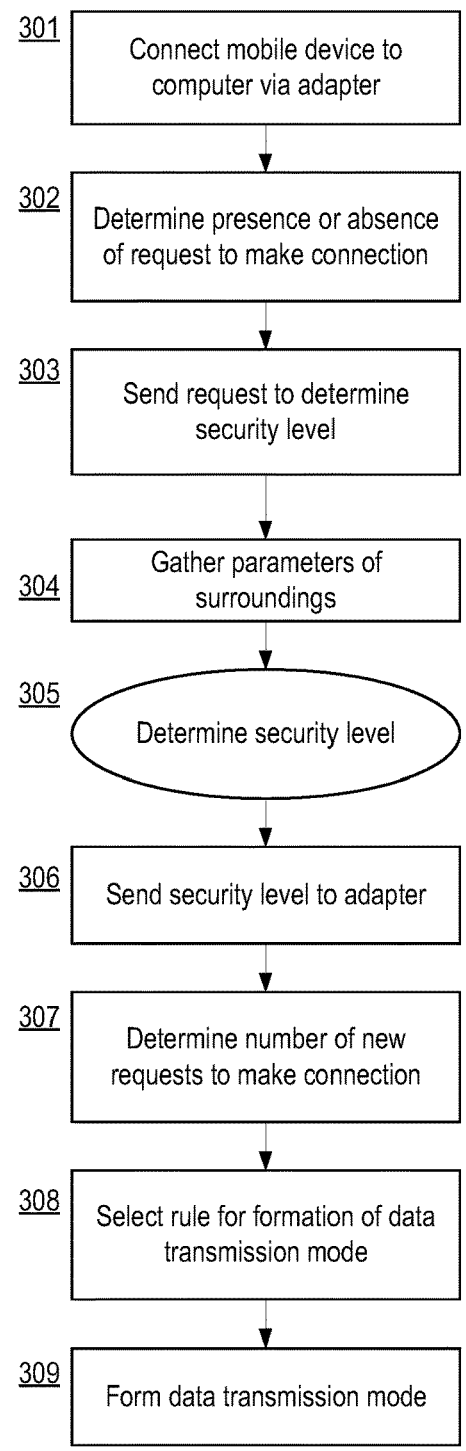
FIG. 3 illustrates a method of formation of a data transmission mode according to aspects of the invention.

FIG. 3 shows a method of formation of the data transmission mode according one exemplary aspect. In step 301, the mobile device 130 may be connected to the computer 110 via the adapter 120 by a wired data transmission interface, wherein the computer 110 may be the power supply source of both the security adapter 120 and the mobile device 130 via the adapter 120, where the adapter 120 may block the data transmission between the mobile device 130 and the computer 110 until the moment of formation of the data transmission mode.

In step 302, the decision-making module 121 at the adapter 120 may determine the presence or absence of a request from the computer 110 to make a connection with the mobile device 130 in order to exchange data during a time specified by the adapter 120. During the first connection to an unknown computer 110 (e.g., a computer to which the mobile device is being connected for the first time, and the security level has not been saved in the local database 132 for this computer), the adapter 120 may be set up to transmit electric power from the computer to the mobile device 130 and to block the data transmission between the mobile device 130 and the computer 110. In this example, the absence of a request may be considered to be the absence of a request from the computer 110 to the adapter 120 during a waiting time for the request, specified by the adapter 120, after being connected to the computer 110 (for example, 2 seconds).

In step 303, a request for determination of the security level may be transmitted to the mobile device via the transceiver 3 (127) of the adapter 120, where the request may contain information on the presence or absence of a request from the computer 110 to make a connection with the mobile device 103 for a data exchange during a time specified by the adapter 120.

The blocking of the data transmission may be carried out by breaking the connection of the data transmission lines (for example, in USB 2.0, the contacts D+ and D−). The breaking of the data transmission lines may be done both mechanically, by the use of a switch, and with the use of a relay or an optoelectronic circuit.

Using the analysis module 131 in step 304, a number of parameters may be determined and collected. According to aspects of the invention, these parameters may include parameters of the surroundings: the coordinates of the mobile device 130 at the moment of connection to the computer 110, the information received as to the presence or absence of a request to make a connection. Next, in step 305, the mobile application 103 may determine the security level with the use of the parameters of the surroundings, where the security level may be low or high, and may determine the probability of the connection to the computer 110 being secure for the gathered parameters of the surroundings.

The mobile device 130 may transmit the obtained security level to the decision-making module 121, associated with the adapter 120, in step 306.

Next, in step 307, the adapter 120 may determine the number of new requests to make a connection with the mobile device 130 during the time of waiting for the security level from the mobile device 130. That is, from the moment when the adapter requested the security level in step 303 to the moment of receiving the security level in step 306.

In step 308, the adapter 120 may select a rule for the formation of the data transmission mode between the mobile device 130 and the computer 110 from the memory module

124 based on the obtained security level and the counted number of new requests to make a connection, where the rule for the formation of the data transmission mode may include at least one of the following:

continue blocking the data transmission if the security level is high, but during the obtaining of the security level the computer 110 sent to the adapter 120 new requests to make a connection with the mobile device 130 in a number greater than a specified value in the memory module;

continue blocking the data transmission if the security level is low;

unblock the data transmission in all other instances.

As a result, in step 309, the adapter 120 may form the data transmission mode according to the selected rule.

As mentioned above, the blocking of the data transmission may be implemented by breaking the connection of the data transmission lines (for example, in USB 2.0, the contacts D+ and D−). The breaking of the data transmission lines may be done both mechanically, by the use of a switch, and with the use of a relay. The unblocking of the data transmission may be done in the reverse—by making the connection of the data transmission lines.

Thus, if the blocking of data continues according to the formulated data transmission mode, the user's data may not be received by the computer 110 thereby protection is provided to the user's data.

At the same time, the data transmission mode whereby data may be transmitted between the computer 110 and the mobile device 130 may be formed only in the event that the system has sufficient security for data transmission between the devices on the basis of previous connections of the mobile devices to the computer 110 thereby protection is provided to the user's data.

According to some aspects of the invention, the security level may be determined as follows with the use of the parameters of the surroundings:

a) the parameters of the surroundings may be transmitted with the aid of the mobile device 130 via the transceiver 1 (134) by means of the computer network 150 to the remote server 140;

b) in response, the security level may be obtained from the remote server 140 with the aid of the mobile device 130.

In this example, the remote server 140 may analyze the parameters of the surroundings, determine the security level and transmit it to the mobile device 130. A more detailed description will be given of the process of analysis of the parameters of the surroundings by the remote server 140.

According to one exemplary aspect, the security level may be determined using the parameters of the surroundings in the local database 132 of the mobile device 130, in which security levels previously downloaded from the remote server 140 may be stored.

In yet another aspect, the coordinates of the mobile device 130 may be determined with the use of one of:

a) the receiver of a geolocation system;
b) a cellular communication module (such as a GSM module or an LTE module), determining the location based on signals from base stations;
c) the use of data obtained from communication devices of the users of the system.

In other aspects, the parameters of the surroundings may further include the following criterion of the location of the mobile device 130: in a room or outside a room.

In yet another aspect, the location of the mobile device 130 in a room may be determined with the use of the following methods:

a) comparison of geolocation data with a map of the locality;
b) analysis of an audio signal with the use of a microphone;
c) comparison of the degree of similarity of images obtained from a camera to a previously determined set of images;
d) analysis of temperature readings;
e) analysis of humidity readings;
f) analysis of barometer readings;
g) analysis of light sensor readings;
h) analysis of proximity sensor readings;
i) analysis of magnetic field sensor readings.

For example, the analysis of the readings may be done by comparing the values of the readings with the value for a known location.

In another example, the location of the mobile device 130 may be determined by comparing the aforementioned data of sensors with the data of the sensors of other mobile devices from which the remote server 140 has received parameters of the surroundings and has determined their location.

In yet another example, the parameters of the surroundings may further include weather characteristics determined with the use of the sensors:

a) an ultraviolet light sensor;
b) a sensor of the ambient temperature;
c) a barometer;
d) a humidity sensor;
e) an illumination sensor;
f) a dosimeter.

According to one exemplary aspect, the rule of formation of the data transmission mode between the mobile device 130 and the computer 110 may additionally involve the following: unblocking of the data transmission if a command to unblock the data transmission arrives at the input device 122 from the user.

Figure 4:
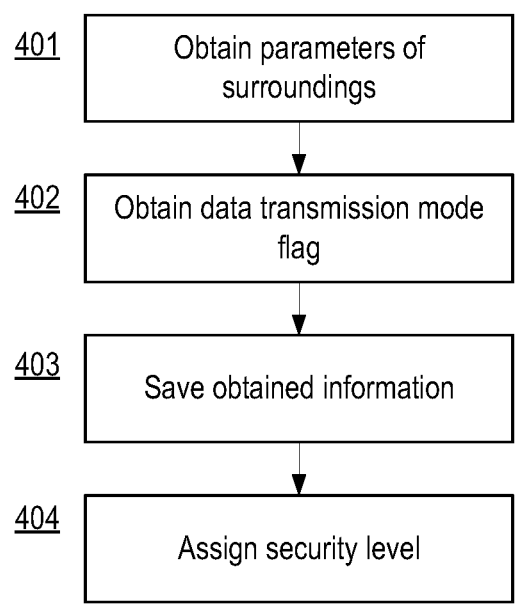
FIG. 4 illustrates a method of determining the level of security with the help of a remote server according to aspects of the invention.

FIG. 4 shows an exemplary aspect of a method of determining the security level with the aid of a remote sensor 140, as previously mentioned in step 305.

In step 401, the processing device 142 may receive from one or more mobile devices 130 via the computer network 150 a collection of parameters of the surroundings. The collection of parameters of the surroundings may contain:

the coordinates of the mobile device 130 at the moment of connection to the computer 110;

the information as to the presence or absence within a time specified by the adapter 120 of a request to make a connection with the mobile device 130 for exchange of data.

In step 402, the processing device 142 may also receive from the mobile device 130 a data transmission mode flag for each group of parameters of the surroundings. This flag may be equal to one if the data transmission was permitted by the mobile device between the mobile device 130 and the computer 110. Otherwise, the flag may be equal to zero. Permission for the data transmission may be obtained, for example, from the user via the input device 122 on the adapter 120 or by means of the mobile device 130.

In step 403, the processing device 142 may save the parameters of the surroundings and the data transmission mode flag corresponding to each group of parameters of the surroundings in the database of surroundings 143.

In step 404, the security level may be assigned with the aid of the analysis module 141 for each group of parameters of the surroundings based at least on the parameters of the surroundings and the value of the data transmission mode flag in keeping with the rules for assigning the security level, wherein the security level may be used by the mobile device 130 in the formation of the data transmission mode between the mobile device 130 and the computer 110.

Thus, the assigning of the security level and its use in the formation of the data transmission mode between the mobile device 130 and the computer 110 may protect the user's data.

In one aspect, the analysis module 141 may assign an identical security level for groups of parameters of the surroundings which coincide with each other with a specified accuracy.

For example, a first group of parameters of the surroundings may contain the coordinates X1, Y1 and information as to the presence of a request to make a connection. A second group of parameters may contain the coordinates X2, Y2 and information as to the presence of a request to make a connection. In this example, if the parameters of the surroundings for both sets of parameters satify a specified accuracy (for example, the distance between the groups may be less than 20 meters: $\sqrt{(X1-X2)^2+(Y1-Y2)^2} \le L=20$ and a request to make a connection may be present for both groups), they may have an identical identifier of the surroundings, such as 1. It should be noted that any other metric may be used to measure the distance, including the use of three coordinates (latitude, longitude, altitude above sea level).

In other aspects, the rules of assigning the security level may include the following:
  if a request from the computer to make a connection with the mobile device is absent in the parameters of the surroundings, a high value of the security level may be assigned, determining a high probability that the connection of the mobile device to the computer is secure;
  if the number of groups of parameters of the surroundings coinciding with each other with a specified accuracy whose data transmission mode flag is equal to one, divided by the number of all groups of parameters of the surroundings from the database of surroundings, is higher than a specified value, and also the parameters of the surroundings include the presence of a request from the computer to make a connection with the mobile device, a high value of the security level may be assigned;
  in all other instances, a low value of the security level may be assigned, determining a low probability that the connection of the mobile device to the computer is secure.

Some aspects discussed with respect to FIG. 3 may also be applicable to the method of FIG. 4.

The probability that the connection is secure may be calculated in various ways. For example, the probability may be equal to the number of permissions to carry out a data transmission when connecting the mobile device to this computer. For example, if at some time 1000 mobile devices may be connected to this computer, and 500 of the users of the mobile devices permitted the data transmission, the probability is equal to 50%. The probability value for which the security level may be considered to be high may be established in advance, for example, as 50%. In this example, the security level is high. Alternatively, if the users of the mobile devices permitted a data transmission in only 100 cases of the 1000 connections to the computer, the security level may be low.

It should be noted that any known methods and algorithms of the theory of probability and mathematical statistics may be used to calculate the probability that the connection is secure, based on the data obtained from the users of the system.

The analysis module 141 may save the specified security level in a database of security levels 144, which may contain at least one value of security level.

As a result, in response to a new request from the mobile device 130, containing the parameters of the surroundings for a new connection of the mobile device 130 to the computer 110, the analysis module 141 may transmit to the mobile device 130 the security level from the database of security levels 141 corresponding to the received parameters of the surroundings.

Figure 5:
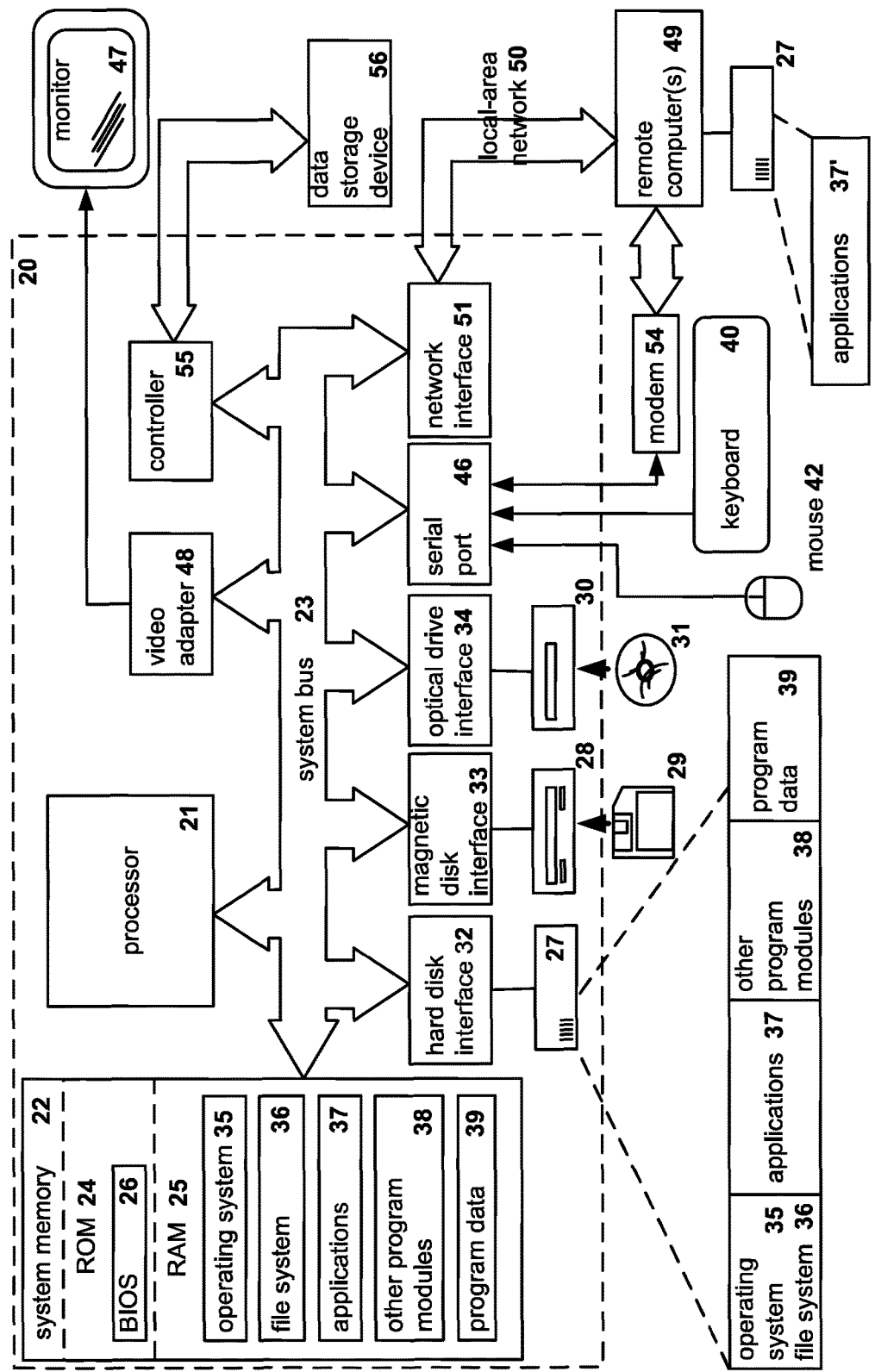
FIG. 5 illustrates an example of a general-purpose computer system on which the disclosed aspects of systems and method can be implemented.

FIG. 5 illustrates an example of a computer system or computing device on which the disclosed systems and method may be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a user computer or computing device (such as analysis modules 131, 141 and decision-making module 121 described in greater detail in FIGS. 1 and 2 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for protecting data of a mobile device, the method comprising:
   connecting the mobile device with a computer via a security adapter for charging the mobile device, wherein the security adapter is connected to the mobile device and the computer via a wired transmission interface;
   in response to receiving a request from the computer for exchanging data with the mobile device, determining and collecting, by a processor of the mobile device, a plurality of parameters relating to an establishment of a data transmission mode between the computer and the mobile device;
   in response to receiving a request to determine a security level of the mobile device, the request transmitted from a transceiver of the security adapter to the mobile device, determining, by the processor of the mobile device, a security level of the establishment of the data transmission mode based at least on the plurality of parameters; and
   transmitting the security level to the transceiver of the security adapter for determining rules for establishing the data transmission mode between the computer and the mobile device.

2. The method of claim 1, wherein the computer is a power supply source for both the security adapter and the mobile device via the security adapter, wherein determining the security level of the establishment of the data transmission mode based at least on the plurality of parameters comprises transmitting by the mobile device the plurality of parameters to a remote server for determining the security level.

3. The method of claim 2, wherein determining the security level of the establishment of the data transmission mode based at least on the plurality of parameters comprises:
   obtaining various parameters and security levels from the remote server;
   storing the various parameters and security levels on a local database of the mobile device; and determining the security level of the establishment of the data transmission mode at least in connection with saved parameters and security levels on the local database of the mobile device.

4. The method of claim 1, wherein the plurality of parameters comprise coordinates of the mobile device determined via at least one of: a receiver of a geolocation system; a cellular communication module determining a location of the mobile device based on signals from base stations; and data obtained from other communication devices.

5. The method of claim 1, wherein the plurality of parameters comprise information relating to a location of the mobile device inside or outside a room.

6. The method of claim 5, wherein the information relating to the location of the mobile device inside the room is determined by at least one of:
    a comparison of geolocation data with a map of locality;
    an analysis of an audio signal via a microphone;
    a comparison of a degree of similarity of images obtained from a camera to a previously determined set of images; and
    an analysis of at least one of: temperature readings; humidity readings; barometer readings; light sensor readings; proximity sensor readings; magnetic field sensor readings.

7. A computer-implemented method for protecting data of a mobile device, the method comprising:
    connecting the mobile device with a computer via a security adapter for charging the mobile device;
    receiving by the security adapter a request from the computer for exchanging data with the mobile device;
    transmitting the request to the mobile device for determining a security level of an establishment of a data transmission mode between the mobile device and the computer;
    in response to receiving the security level from the mobile device, determining a number of additional requests from the computer for establishing the data transmission mode with the mobile device while the mobile device determining the security level in response to the request;
    determining one or more rules for establishing the data transmission mode between the computer and the mobile device based at least on the security level and the number of additional requests from the computer; and
    establishing the data transmission mode between the computer and the mobile device in connection with the one or more rules.

8. The method of claim 7, further comprising blocking a data transmission between the mobile device and the computer until the time of formation of the data transmission mode.

9. The method of claim 8, wherein the computer is a power supply source for both the security adapter and the mobile device via the security adapter, wherein the one or more rules comprise at least one of:
    continue blocking the data transmission if the security level is high, but during the obtaining of the security level the computer sent to the security adapter new requests to make a connection with the mobile device in a number greater than a specified value in the memory module;
    continue blocking the data transmission if the security level is low; and
    unblock the data transmission in all other instances.

10. The method of claim 9, wherein the one or more rules comprise unblocking of the data transmission if a command to unblock the data transmission received from a user of the mobile device.

11. A security adapter for protecting data of a mobile device when connecting the mobile device to a computer, the security adapter comprising:
    a plug for connecting to a port of the computer by a wired data transmission interface;
    a port for connecting to a plug of the mobile device by the wired data transmission interface;
    a transceiver for interacting with a decision-making module and configured to:
        send a request to the mobile device for determining a security level of a data transmission between the mobile device and the computer, and
        receive from the mobile device the security level;
    wherein the decision-making module is configured to:
        determine a presence or absence of a request from the computer for establishing the data transmission with the mobile device during a specified time,
        transmit the determined information to the transceiver,
        block data transmissions between the mobile device and the computer until a data transmission mode there between,
        receive from the transceiver the security level,
        count a number of additional requests from the computer for establishing the data transmission mode with the mobile device while the mobile device determining the security level in response to the request,
        select at least one rule for establishing the data transmission mode between the mobile device and the computer from the memory module based on the security level and the number of additional requests, and
        establish the data transmission mode between the mobile device and the computer in accordance with the at least one rule;
    wherein the memory module is configured to obtain and store rules for establishing the data transmission mode between the mobile device and the computer.

12. The security adapter of claim 11, wherein the computer is a power supply source for both the security adapter and the mobile device via the security adapter, wherein the one or more rules comprise at least one of:
    continue blocking the data transmission if the security level is high, but during the obtaining of the security level the computer sent to the security adapter new requests to make a connection with the mobile device in a number greater than a specified value in the memory module;
    continue blocking the data transmission if the security level is low; and
    unblock the data transmission in all other instances.

13. The security adapter of claim 11, wherein the one or more rules comprise unblocking of the data transmission if a command to unblock the data transmission received from a user of the mobile device.

14. A device for determining a security level of an establishment of a data transmission mode, the device comprising:
    a processor of the device configured to:
        connect a mobile device with a computer via a security adapter for charging the mobile device, wherein the security adapter is connected to the mobile device and the computer via a wired transmission interface;

in response to receiving a request from the computer for exchanging data with the mobile device, determine and collect a plurality of parameters relating to an establishment of a data transmission mode between the computer and the mobile device;

in response to receiving a request to determine a security level of the mobile device, the request transmitted from a transceiver of the security adapter to the mobile device, determine a security level of the establishment of the data transmission mode based at least on the plurality of parameters; and transmit the security level to the transceiver of the security adapter for determining rules for establishing the data transmission mode between the computer and the mobile device.

15. The device of claim 14, wherein the computer is a power supply source for both the security adapter and the mobile device via the security adapter, wherein, to determine the security level of the establishment of the data transmission mode based at least on the plurality of parameters, the processor is further configured to transmit the plurality of parameters to a remote server for determining the security level.

16. The device of claim 15, wherein the processor is further configured to:
obtain various parameters and security levels from the remote server;
store the various parameters and security levels on a local database of the mobile device; and
determine the security level of the establishment of the data transmission mode at least in connection with saved parameters and security levels on the local database of the mobile device.

17. A non-transitory computer readable medium storing computer executable instruction for protecting data of a mobile device, including instructions for:
connecting the mobile device with a computer via a security adapter for charging the mobile device, wherein the security adapter is connected to the mobile device and the computer via a wired transmission interface;
in response to receiving a request from the computer for exchanging data with the mobile device, determining and collecting, by a processor of the mobile device, a plurality of parameters relating to an establishment of a data transmission mode between the computer and the mobile device;
in response to receiving a request to determine a security level of the mobile device, the request transmitted from a transceiver of the security adapter to the mobile device, determining, by the processor of the mobile device, a security level of the establishment of the data transmission mode based at least on the plurality of parameters; and
transmitting the security level to the transceiver of the security adapter for determining rules for establishing the data transmission mode between the computer and the mobile device.

18. A non-transitory computer readable medium storing computer executable instruction for protecting data of a mobile device, including instructions for:

connecting the mobile device with a computer via a security adapter for charging the mobile device;
receiving by the security adapter a request from the computer for exchanging data with the mobile device;
transmitting the request to the mobile device for determining a security level of an establishment of a data transmission mode between the mobile device and the computer;
in response to receiving the security level from the mobile device, determining a number of additional requests from the computer for establishing the data transmission mode with the mobile device while the mobile device determining the security level in response to the request;
determining one or more rules for establishing the data transmission mode between the computer and the mobile device based at least one the security level and the number of additional requests from the computer; and
establishing the data transmission mode between the computer and the mobile device in connection with the one or more rules.

19. A system for ensuring data security in establishing a data transmission mode between devices, the system comprising:
a mobile device connected with a computer via a security adapter for charging purposes; and
the security adapter,
wherein the mobile device is configured to:
determine and collect a plurality of parameters relating to an establishment of the data transmission mode between the computer and the mobile device in response to a request from the computer,
determine a security level of the establishment of the data transmission mode based at least on the plurality of parameters, and
transmit the security level to the security adapter;
wherein the security adapter is configured to:
in response to receiving the security level from the mobile device, determine a number of additional requests from the computer for establishing the data transmission mode with the mobile device while the mobile device determining the security level;
determine one or more rules for establishing the data transmission mode between the computer and the mobile device based at least on the security level and the number of additional requests from the computer; and
establish the data transmission mode between the computer and the mobile device in connection with the one or more rules.

20. The system of claim 19, wherein the computer is a power supply source for both the security adapter and the mobile device via the security adapter, wherein the security adapter is configured to block a data transmission between the mobile device and the computer until the time of formation of the data transmission mode.

* * * * *